United States Patent [19]

Nagano

[11] Patent Number: 5,307,706
[45] Date of Patent: May 3, 1994

[54] SPEED CONTROL APPARATUS FOR BICYCLE HAVING A SOUND PRODUCING DEVICE

[75] Inventor: Masashi Nagano, Osaka, Japan

[73] Assignee: Shimano Inc., Osaka, Japan

[21] Appl. No.: 860,136

[22] Filed: Mar. 30, 1992

[30] Foreign Application Priority Data

Apr. 4, 1991 [JP] Japan .................. 3-071362

[51] Int. Cl.⁵ .................. F16C 1/10; G05G 11/00
[52] U.S. Cl. .................. 74/502.2; 74/531; 74/483
[58] Field of Search .................. 74/502.2, 489, 488, 74/516, 518, 526, 475, 531, 527

[56] References Cited

U.S. PATENT DOCUMENTS

| | | | |
|---|---|---|---|
| 3,856,123 | 12/1974 | Kinsey | 74/475 X |
| 3,945,477 | 3/1976 | Maucher et al. | 74/475 X |
| 4,699,018 | 10/1987 | Tagawa | 74/527 X |
| 4,905,537 | 3/1990 | Nagano | 74/531 |
| 4,966,046 | 10/1990 | Tagawa | 74/475 |
| 5,012,692 | 5/1991 | Nagano | 74/489 X |
| 5,186,072 | 2/1993 | Nagano | 74/502.2 |
| 5,203,213 | 4/1993 | Nagano | 74/475 |

FOREIGN PATENT DOCUMENTS

| | | | |
|---|---|---|---|
| 2529852 | 7/1983 | France | 74/502.2 |
| 2540818 | 2/1984 | France | 74/502.2 |
| 56-31519 | 7/1981 | Japan | 74/502.2 |
| 63-232093 | 9/1988 | Japan | 74/502.2 |
| 2102893 | 8/1979 | United Kingdom | 74/502.2 |

Primary Examiner—Vinh T. Luong
Attorney, Agent, or Firm—Dickstein, Shapiro & Morin

[57] ABSTRACT

A speed control apparatus for a bicycle for selecting a speed position from a plurality of speed positions based on a wire winding amount. This apparatus includes a fixed element, a displaceable control lever, a takeup element pivotally supported by the fixed element for winding a wire, the takeup element being rotatable to rotate the takeup portion by the displacement of the control lever in a wire winding direction to select one of the speed positions, and a position setting mechanism disposed between the control lever and the fixed element. The position setting mechanism includes a clutch pawl and clutch teeth. The clutch pawl is movable between an engaging position to engage the clutch teeth and a retracted position away from the clutch teeth. The takeup element is retained in a selected speed position by the clutch pawl engaging one of the clutch teeth. This speed control apparatus further includes a hammer for amplifying movement of the clutch pawl to the engaging position and transmitting the movement as a shock. The hammer strikes an apparatus casing acting as a resonant body to produce a sound.

9 Claims, 10 Drawing Sheets

SPEED CONTROL APPARATUS FOR BICYCLE HAVING A SOUND PRODUCING DEVICE

BACKGROUND OF THE INVENTION

1. Field of the Invention

The present invention relates to an improvement in a speed control apparatus for a bicycle having a sound producing device for notifying completion of a change speed operation or the like.

2. Description of the Related Art

In the field of bicycle speed control apparatus, an apparatus having an engaging element and an engageable element to retain a wire takeup element in a selected speed position is known to produce a sound to notify completion of a change speed operation as disclosed in Japanese Patent Publication No. 1988-232093 or Japanese Utility Model publication No. 1981-31519, for example. Such a sound is produced when the engaging and engageable elements contact each other at the end of a change speed operation.

According to the prior art, however, the wire takeup element or other rigidly fixed component is used as a sound producing body, and the sound thereby produced is slight. Where a casing is used as the sound producing body, the sound produced when the casing is struck is not loud either. This is because a striking element is displaced only a small amount for striking action, resulting in a weak impact. Such a slight sound is often inaudible particularly in noisy environments.

SUMMARY OF THE INVENTION

An object of the present invention is to overcome the above-noted disadvantage and provide a speed control apparatus for a bicycle having a loud sounding body and striking element to produce a louder sound than was heretofore possible, thereby reliably notifying completion of a change speed operation.

The above object is fulfilled, according to the present invention, by a speed control apparatus for a bicycle for selecting a speed position from a plurality of speed positions based on a wire winding amount, which apparatus comprises a fixed element, a displaceable control member, a takeup portion pivotally supported by the fixed element for winding a wire, the takeup portion being rotatable to rotate said takeup portion by the displacement of the control member in a wire winding direction to select one of the plurality of speed positions, and a position setting mechanism disposed between the control member and the fixed element. The position setting mechanism includes an engaging element and an engageable element. The engaging element is movable between an engaging position to engage the engageable element and a retracted position away from the engageable element. The takeup portion is retained in a selected speed position by the engaging element engaging the engageable element. This speed control apparatus further comprises a sound producing device for amplifying a shock resulting from movement of the engaging element to the engaging position to produce a sound.

According to the above construction, the sound producing device employs a sound producing body having an appropriate resonance frequency, a casing enclosing the speed control apparatus as a sound producing body, or a hammer for imparting a strong percussive force. Such a sound producing device produces a sound by amplifying a shock more effectively than in the prior art. Consequently, the apparatus according to the present invention is capable of producing a louder sound than was heretofore possible, thereby reliably notifying completion of a change speed operation.

Further and other objects, features and advantages of the invention will become more apparent from the following more detailed description of the preferred embodiments of the invention taken with reference to the accompanying drawings.

DETAILED DESCRIPTION OF THE PREFERRED EMBODIMENTS

Figure 1:
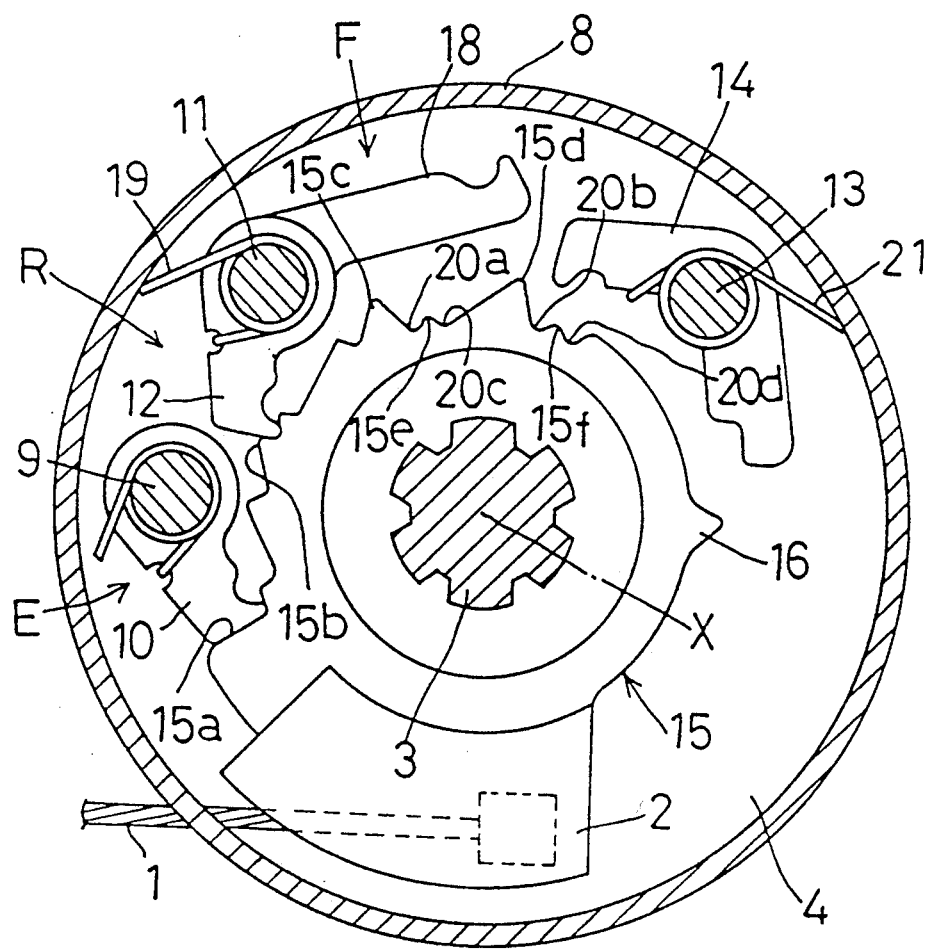
FIG. 1 is a plan view showing a first speed position of a change speed apparatus according to the present invention.
Figure 8:
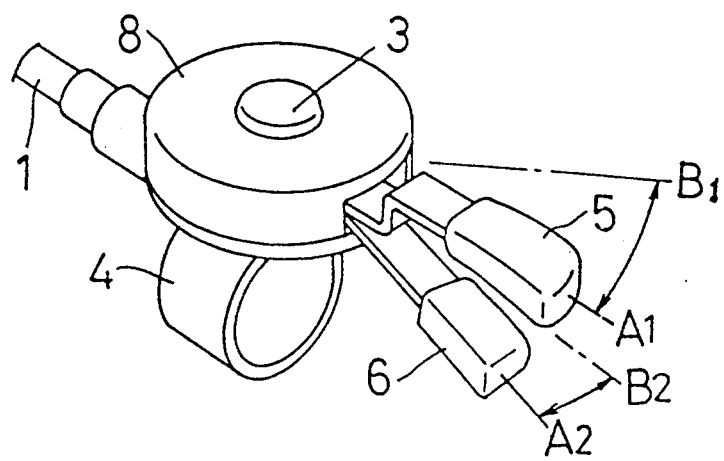
FIG. 8 is an overall perspective view of the change speed apparatus.

A two-lever type speed control apparatus according to the present invention will be described with reference to the drawings. As shown in FIG. 1, a change speed wire 1 is wound on a takeup element 2 attached to a supporting bracket (or fixed element) 4 to be rotatable about an axis X of a support shaft 3. As shown in FIG. 8, an accelerator lever (or displaceable control member) 5 and a decelerator (or displaceable control member) lever 6 are attached to the supporting bracket 4 through the support shaft 3 to be pivotable independently of each other about the axis X. A speed control mechanism E including a feed pawl (or engaging element) 10 and other components is operable by the accelerator lever 5 and decelerator lever 6 to rotate the takeup element 2. A charge speed case 8 is supported by the bracket 4 through the support shaft 3 for enclosing the takeup element 2 and speed control mechanism E as well as the support shaft 3. The levers 5 and 6 are pivotable to rotate the takeup element 2 to pull and relax the change speed wire 1, thereby to effect three-stage change speed. Details of this speed control apparatus will be described hereinafter.

Each of the accelerator lever 5 and decelerator lever 6 is reciprocable between home position A1 or A2 and shift position B1 and B2 as shown in FIG. 8. The accelerator lever 5 is movable from the home position A1 to the shift position B1 to rotate the takeup element 2 to a selected speed position and maintain the takeup element 2 in that position. Subsequently, the accelerator lever 5 is returned to the home position A1 by a return lever (not shown) attached to the lever 5. The decelerator lever 6 is movable from the home position A2 to the shift position B2 to release the takeup element 2 from the selected speed position and allow the takeup element 2 to rotate in a wire unwinding direction under the force of a rewind spring attached to the takeup element 2 and tension of the change speed wire 1. Subsequently, the decelerator lever 6 is returned to the home position A2 by a return lever attached to the lever 6.

Figure 6:
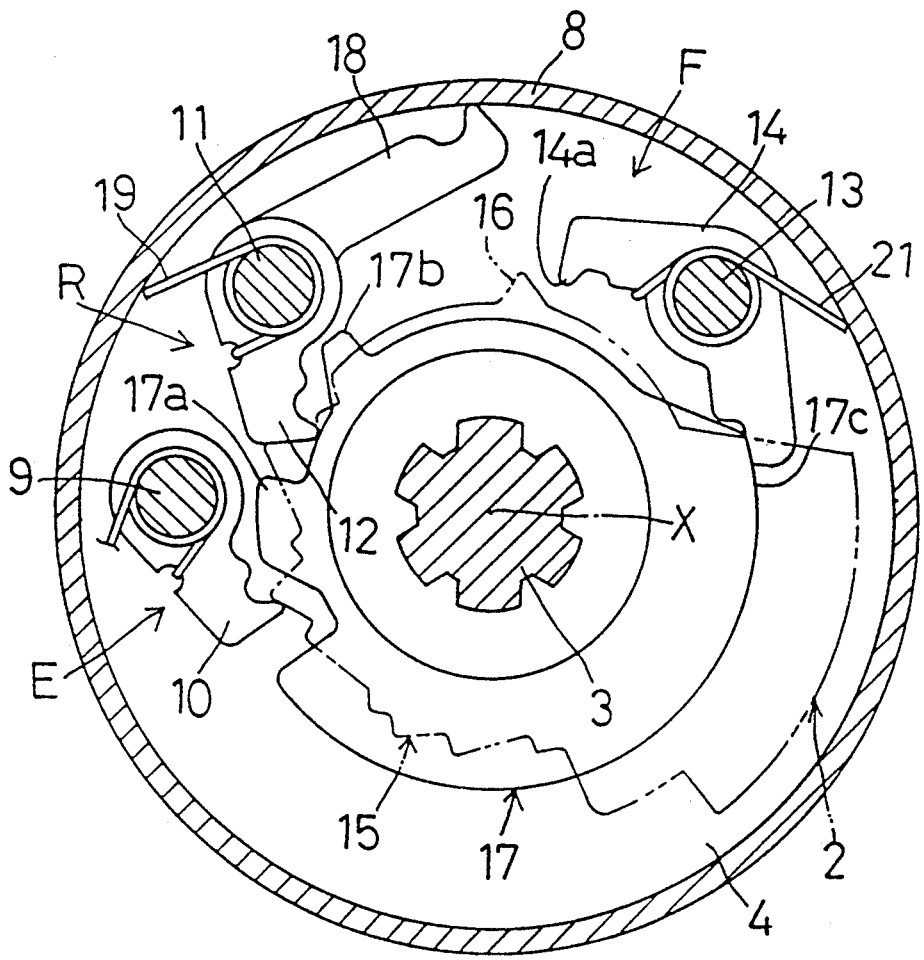
FIG. 6 is a plan view showing configuration of a rotary cam.

First, an accelerating operation will be described in detail. The speed control mechanism E shown in FIG. 1 includes the feed pawl 10 formed as a ratchet pawl pivotably mounted on a pivot axis 9 provided on the accelerator lever 5 (FIG. 8), a first stopper pawl 12 pivotably mounted on a pivot axis 11 provided on the supporting bracket 4, and a second stopper pawl 14 pivotably mounted on a pivot axis 13 provided on the supporting bracket 4. The speed control mechanism E further includes a rotatable an engageable element 15 rotatable with the takeup element 2 to act as a position setter, and a rotatable element 17 as shown in FIG. 6 which is formed on a boss of the decelerator lever 6 to act on the pawls 10, 12 and 14. A single pivotal movement of the accelerator lever 5 from the home position A1 to the shift position B1 is capable of changing only from one speed position to a next higher speed position. A single pivotal movement of the decelerator lever 6 from the home position A2 to the shift position B2 is capable of changing only from one speed position to a next lower speed position.

Figure 2:
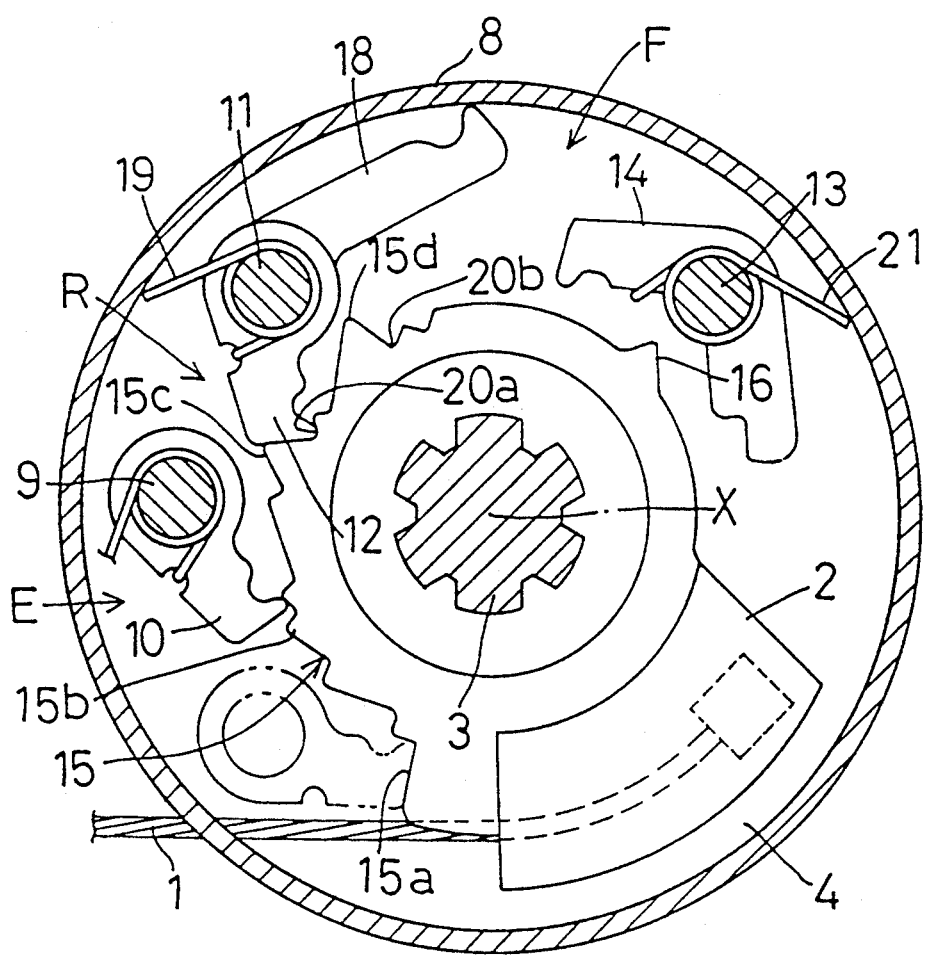
FIG. 2 is a plan view showing a second speed position with a hammer striking a sound producing body.

Specifically, when the accelerator lever 5 pivots from the home position A1 to the shift position B1, the feed pawl 10 engages a contact portion 15a of the rotatable element 15 and moves about the axis X, thereby rotating the takeup element 2 from a first speed position shown in FIG. 1 to a second speed position shown in FIG. 2. When the takeup element 2 is rotated to the second speed position, a ratchet mechanism R including the rotatable element 15, first stopper pawl 12 and second stopper pawl 14 retains the takeup element 2 in the second speed position. That is, the first stopper pawl 12 engages a tooth 15c of the rotatable element 15 and retains the takeup element 2 in the second speed position against rotating in the wire unwinding direction regardless of the biasing force of the rewind spring (not shown) attached to the takeup element 2 and tension of the change speed wire 1. After the change speed operation, the accelerator lever 5 returns to the home position A1 under the force of the return spring. At this time, the feed pawl 10 slides circumferentially of the rotatable element 15 into engagement with a ratchet tooth 15b.

When accelerating from the second speed position to a third speed position, the speed control mechanism E operates in substantially the same way as when accelerating from the first speed position to the second speed position. Thus, when the accelerator lever 5 pivots from the home position A1 to the shift position B1, the feed pawl 10 engaging the tooth 15b of the rotatable element 15 moves about the axis X, thereby rotating the takeup element 2 from the second speed position shown in FIG. 2 to the third speed position shown in FIG. 4. When the takeup element 2 is rotated to the third speed position, the ratchet mechanism R retains the takeup element 2 in the third speed position. Specifically, the first stopper pawl 12 engages a tooth 15d of the rotatable element 15 and retains the takeup element 2 in the third speed position against rotating in the wire unwinding direction regardless of the biasing force of the rewind spring (not shown) attached to the takeup element 2 and tension of the change speed wire 1. After the change speed operation, the accelerator lever 5 returns to the home position A1 under the force of the return spring.

Figure 7:
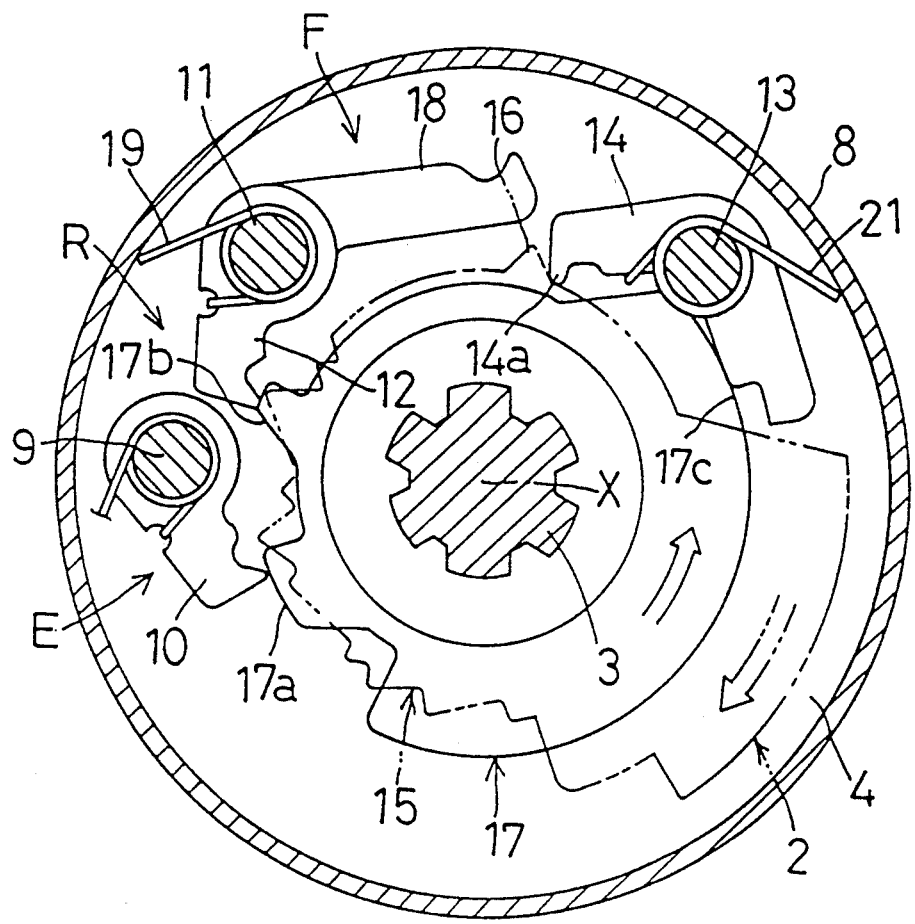
FIG. 7 is a plan view showing the rotary cam lifting clutch pawls to allow rotation in a wire unwinding direction of a rotatable element.

A decelerating operation will be described next. When the decelerator lever 6 pivots from the home position A2 to the shift position B2, the rotatable element 17 rotates with the movement of the decelerator lever 6. At this time, as shown in FIG. 7, a cam portion 17a pushes the feed pawl 10 and a cam portion 17b pushes the first stopper pawl 12 out of engagement with the rotatable element 15, respectively. Consequently, the takeup element 2 becomes rotatable from the third speed position to the second speed position or from the second speed position to the first speed position under the biasing force of the unwind spring and tension of the change speed wire 1. As shown in FIG. 7, the rotatable element 17 has a cam portion 17c push a tip end 14a of the second stopper pawl 14 into engagement with a projection 16 of the rotatable element 15. In this way, the second stopper pawl 14 acts on the projection 16 to prevent the takeup element 2 in rotation from the third speed position to the second speed position from rotating past the second speed position to return directly to the first speed position. After the decelerating operation, the decelerator lever 6 returns to the home position A2 under the force of the return spring. Then, the rotatable cam plate 17 discontinues lifting of the feed pawl 10 and first stopper pawl 12, whereby the first stopper pawl 12 is allowed to engage the tooth 15b or 15c of the rotatable element 15. The second stopper pawl 14 is no longer pushed, and is now allowed to retract from the projection 16 under the force of a return spring attached to the second stopper pawl 14. Consequently, the takeup element 2 is set to and retained in the second speed position or first speed position, which is now ready for rotation by the accelerator lever 5. The above construction may dispense with the return spring 21, in which case the second stopper pawl 14 is pushed by the projection 16 with rotation of the rotatable cam plate 15, to disengage from the projection 16.

Thus, the accelerator lever 5 is operated for acceleration, and the decelerator lever 6 for deceleration. The pivotal movement of the accelerator lever 5 from the home position A1 to the shift position B1 imparts an operating force to rotate the takeup element 2 from the first speed position to the second speed position or from the second speed position to the third speed position, pulling and winding the change speed wire 1 for acceleration. The pivotal movement of the decelerator lever 6 from the home position A2 to the shift position B2 allows the takeup element 2 to rotate from the third speed position to the second speed position or from the second speed position to the first speed position, relaxing and unwinding the change speed wire 1 for deceleration.

A sound producing mechanism will be described next.

As shown in FIG. 1, the first stopper pawl 12 has a sound producing hammer 18 formed integral therewith for striking the change speed case 8 to produce a sound. The change speed case 8 may be a resonant body. Upon completion of a change speed operation with the accelerator lever 5, a control mechanism F including the first stopper pawl 12 causes the hammer 18 to strike the change speed case 8 for producing a sound notifying the completion. With this control mechanism F, the first stopper pawl 12 is biased toward the rotatable element 15 so that a tip end of the first stopper pawl 12 contact a recess 20a of the rotatable element 15 upon completion of the movement from the first speed position to the second speed position. Specifically, a spring 19 is provided whereby the hammer 18 pivots against the change speed case 8 each time the accelerator lever 5 is operated to rotate the takeup element 2 for acceleration. As means for amplifying the impact, a tip end of the hammer 18 has a greater distance than the tip end of the first stopper pawl 12 to the center of the pivot axis 11. Consequently, the hammer 18 is displaceable by a large amount to obtain a great impact regardless of the limitation to displacement of the first stopper pawl 12 due to height of the teeth 15 of the rotatable element 15.

Figure 4:
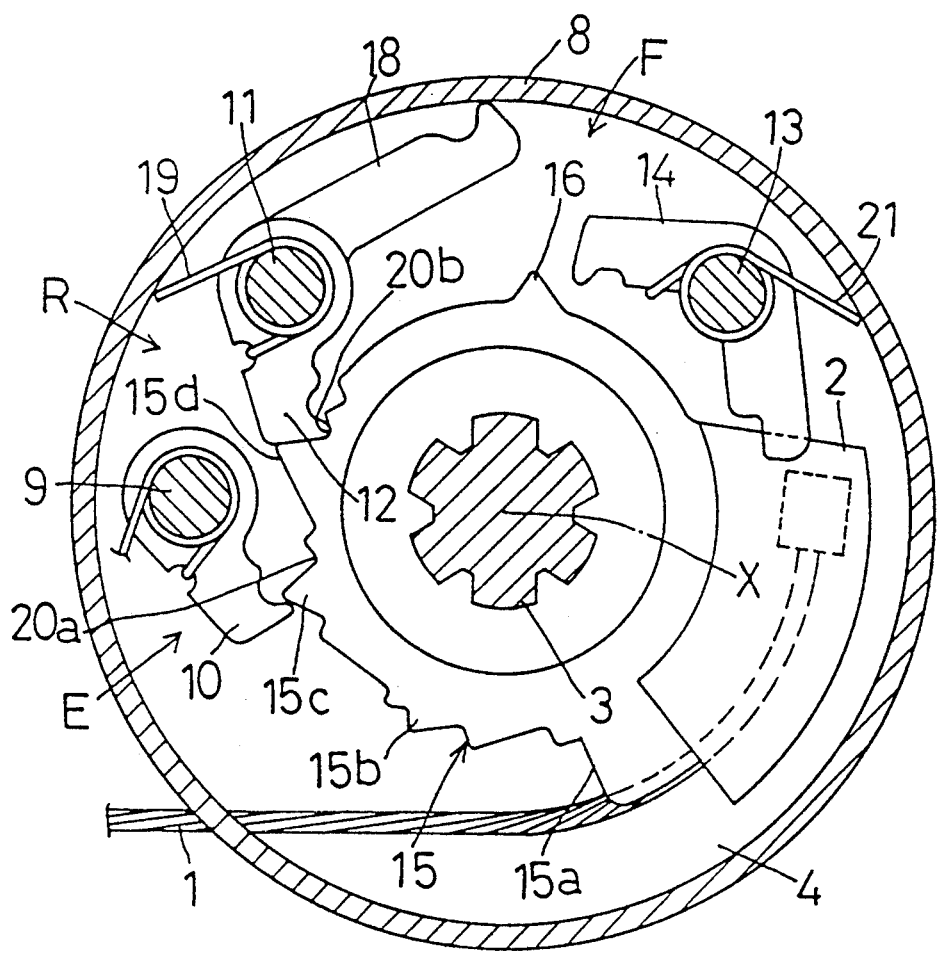
FIG. 4 is a plan view showing a third speed position with the hammer striking the sound producing body.

Specifically, the rotatable element 15 defines recesses 20a and 20b adjacent the teeth 15c and 15d, respectively. With the pivotal movement of the accelerator lever 5 from the home position A1 to the shift position B1, the tip end of the first stopper pawl 12 falls into the recess 20a or 20b as shown in FIGS. 2 or 4. At the same time, the hammer 18 strikes the change speed case 8 to produce a sound.

Figure 3:
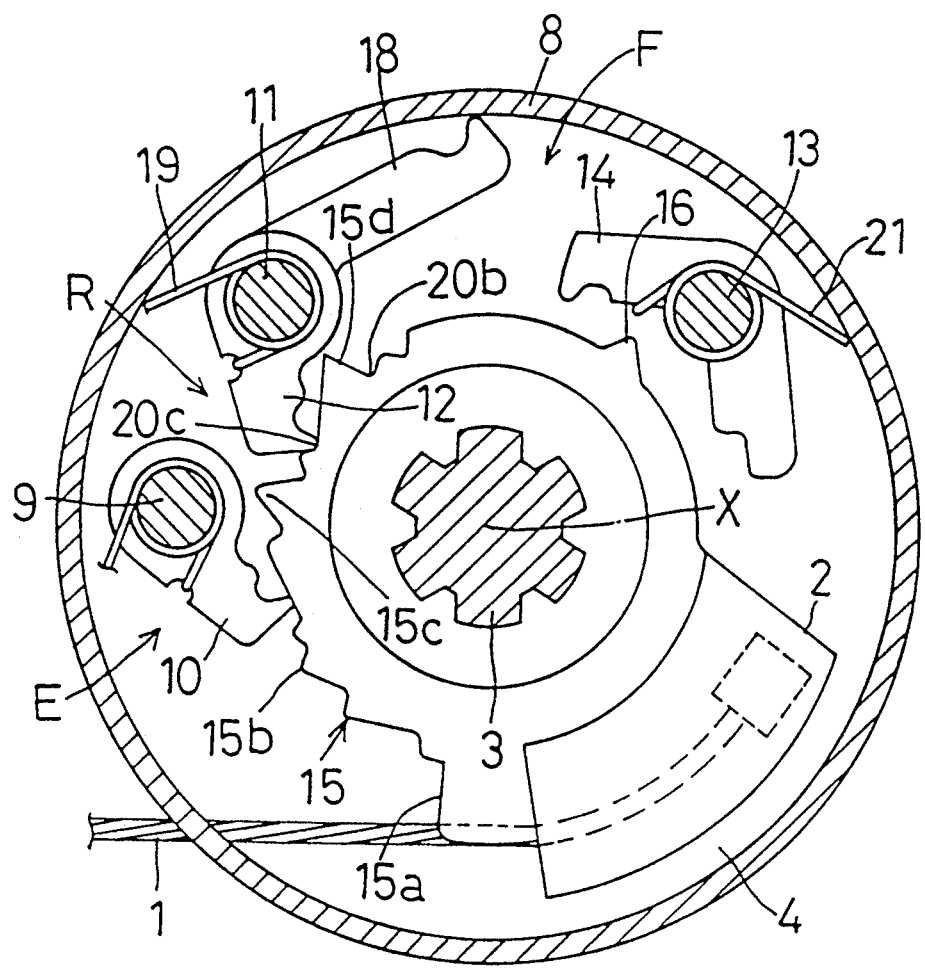
FIG. 3 is a plan view showing an overshift position corresponding to the second speed position with the hammer striking the sound producing body.
Figure 5:
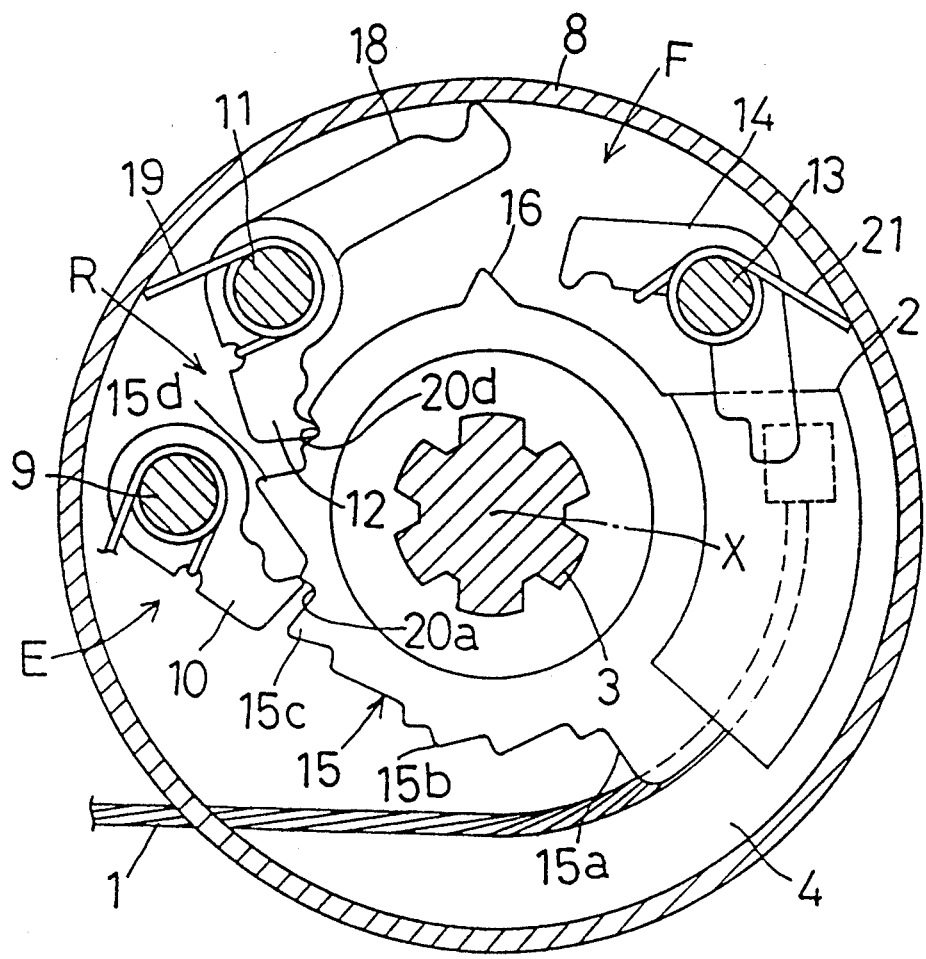
FIG. 5 is a plan view showing an overshift position corresponding to the third speed position with the hammer striking the sound producing body.

The rotatable element 15 includes small teeth 15e and 15f as shown in FIGS. 1 through 5, which notify the cyclist of an overstroke operation corresponding to about 7 to 8 degree rotating angle of the rotatable element 15 when a shift is made from first speed to second speed or from second speed to third speed. The rotatable element 15 further includes recesses 20c and 20d which, as shown in FIGS. 3 or 5, receive the tip end of the first stopper pawl 12 at the time of an overstroke operation, to allow the hammer 18 to strike the change speed case 8 and produce a sound.

Where, as above, the change speed case 8 is used as a sound producing body, a loud sound may be produced, compared with the prior art, in that the change speed case 8 is large and located in an outermost position of the speed control apparatus. Further, the hammer 18 is displaceable by a much larger amount than in the prior art at the end of a change speed operation. This also contributes to production of a loud sound.

Figure 9:
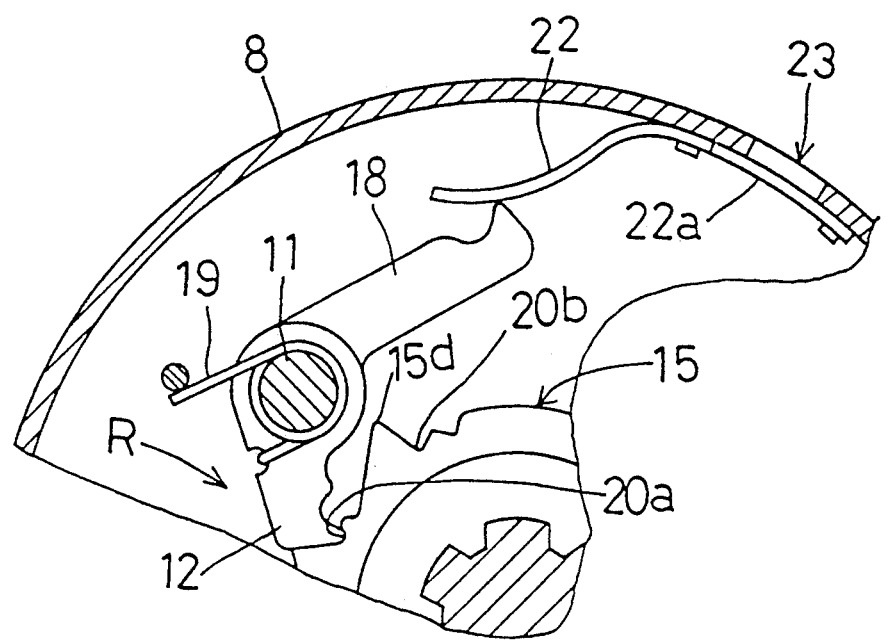
FIG. 9 is a fragmentary plan view of another embodiment of the invention including a sound producing plate secured to a casing.

FIG. 9 shows another embodiment for producing a notifying sound, in which a sound producing plate 22, also a resonant body, is attached to an inside wall of the change speed case 8, and the hammer 18 strikes this plate 22 to produce a sound. In this case, the notifying sound may be produced by both the change speed case 8 and sound producing plate 22. The change speed case 8 defines a sound opening 23 to facilitate propagation of the sound of the plate 22 outwardly of the case 8. The sound opening 23 is closed by a proximal portion 22a of the sound producing plate 22 to avoid entry of dust and the like.

Figure 10:
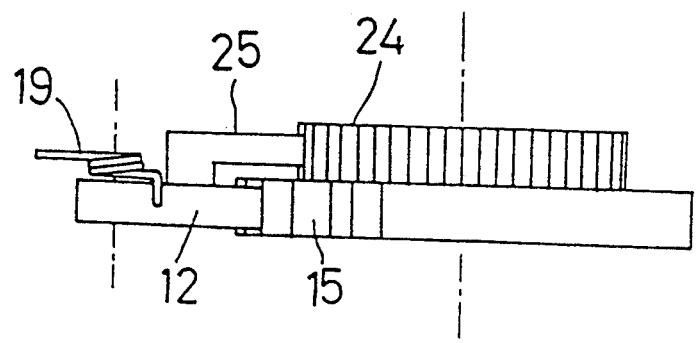
FIG. 10 is a side view of a further embodiment of the invention including a sound producing body attached to a takeup element and a hammer attached to a clutch pawl.
Figure 11:
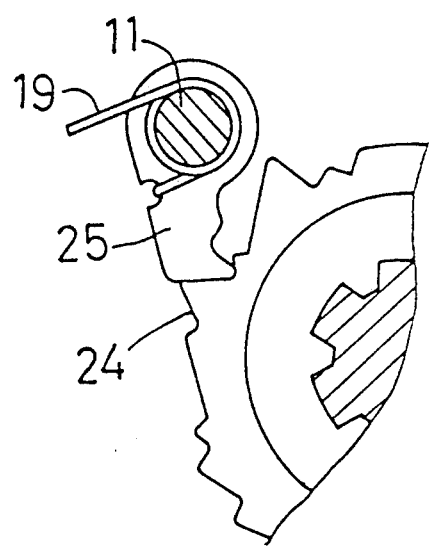
FIG. 11 is a fragmentary plan view of a portion of the embodiment shown in FIG. 10.

FIG. 10 shows a further sound producing mechanism which includes a sound producing plate 24, another resonant body shaped similar to the rotatable element 15 as shown in FIG. 11, and placed on the rotatable element 15 to be rotatable in unison therewith. When the first stopper pawl 12 falls into the recess 20a or 20b of the rotatable element 15, a hammer 25 formed on the first stopper pawl 12 contacts the sound producing plate 24 whereupon each of the plate 24 and hammer 25 produces a sound.

Figure 12:
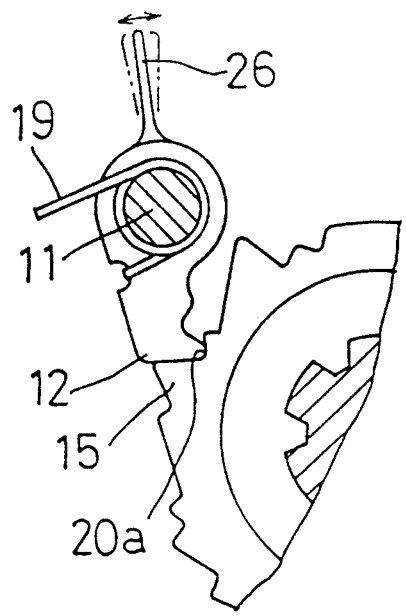
FIG. 12 is a fragmentary plan view of a still further embodiment of the invention including a sound producing body attached to a clutch pawl.
Figure 13:
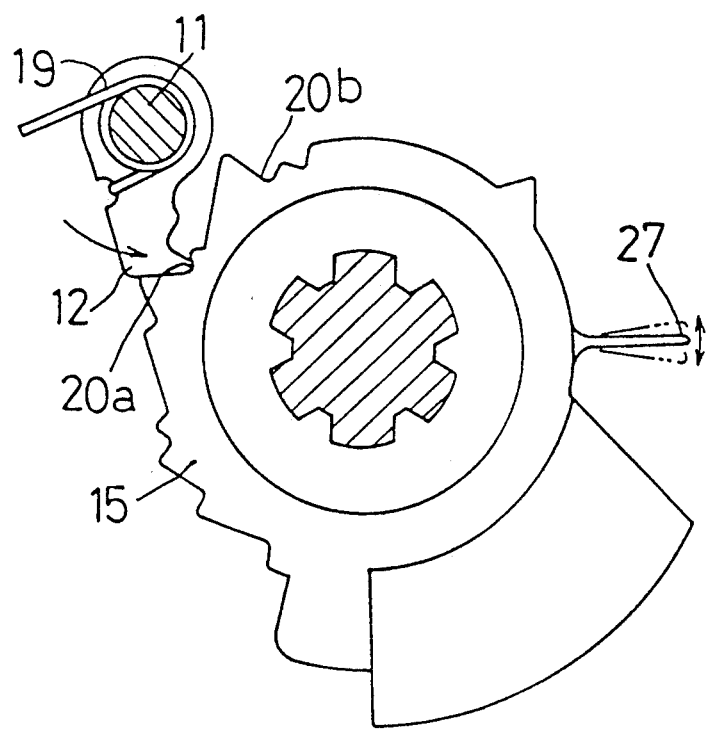
FIG. 13 is a plan view of yet another embodiment of the invention including a sound producing body attached to a rotatable element.

FIG. 12 shows a still further sound producing mechanism, in which the first stopper pawl 12 has a resonant sound producing body 26 formed integral therewith or formed separately and attached thereto. In a different sound producing mechanism as shown in FIG. 13, a resonant sound producing body 27 is formed integral with or attached to the rotatable element 15 in a way to produce a sound more easily than the rotatable element 15. In each of these two examples, when the first stopper pawl 12 falls into the recess 20a or 20b of the rotatable element 15, the sound producing body 26 vibrates by a shock of the first stopper pawl 12 contacting the rotatable element 15, or the sound producing body 27 vibrates by a shock resulting from stoppage of the rotatable element 15 through contact with the first stopper pawl 12, thereby producing a sound. Further, it is possible to employ a sound producing body rotatable with the rotatable element 15 and, upon completion of a change speed operation, contactable by a fixed element to be flipped to produce a sound.

The present invention is applicable to a speed control apparatus having a single lever for shifting in both the accelerating and decelerating directions, and to a construction in which the change speed case is struck at times of deceleration as well as acceleration. Thus, the accelerator lever 5 may be called a change speed lever 5.

To enable the hammer to take striking action based on a change speed operation and timed with completion of the operation, the hammer control mechanism may be directly interlocked to the change speed lever instead of being interlocked to the takeup element as in the foregoing embodiments.

The present invention is applicable also to a speed control apparatus providing four or more speeds.

What is claimed is:

1. A speed control apparatus for a bicycle for selecting a speed position from a plurality of speed positions based on a wire winding amount, said apparatus being arranged for use with a takeup wire, said apparatus comprising:
   a fixed element;
   a displaceable control member;
   a takeup portion for winding the takeup wire, said takeup portion being pivotally supported by said fixed element, wherein said takeup portion rotates with said control member in a wire winding direction to select one of said plurality of speed positions;
   a position setting mechanism disposed between said control member and said fixed element, said position setting mechanism including an engaging element and an engageable element, and wherein said engaging element moves between an engaging position to engage said engageable element and a retracted position away from said engageable element, and said takeup portion is retained in a selected speed position by said engaging element engaging said engageable element; and sound producing means for amplifying a shock resulting from movement of said engaging element to said engaging position to produce a sound, wherein said sound producing means includes a resonant body for producing a sound by the shock, and a hammer provided on said engaging element for directly striking said resonant body.

2. A speed control apparatus as claimed in claim 1, wherein said engaging element includes a pivot lever that pivots about a pivotal axis, said pivot lever having first and second ends and including an engaging portion at said first end thereof for connecting said engageable element, and wherein said hammer is located at said second end of said pivot lever.

3. A speed control apparatus as claimed in claim 2, wherein said engageable element is formed on a rotatable member which rotates in unison with said takeup portion.

4. A speed control apparatus as claimed in claim 2, wherein the distance between said hammer and said pivotal axis is greater than the distance between said engaging portion and said pivotal axis.

5. A speed control apparatus as claimed in claim 1, wherein said resonant body is a sound producing plate attached to a casing covering said speed control apparatus.

6. A speed control apparatus as claimed in claim 1, wherein said resonant body is a resonant plate attached to a surface of said takeup element, and said hammer is provided on said engaging element for striking said resonant plate from a radially outward direction.

7. A speed control apparatus as claimed in claim 1, wherein said engageable element includes change speed engagement portions corresponding to said plurality of speed positions, and overshift engagement portions disposed at wire winding sides of the respective speed positions, said sound producing means being operable by a shock of engagement between said engaging element and one of said change speed engagement portions and said overshift engagement portions.

8. A speed control apparatus as claimed in claim 1, wherein said position setting mechanism is formed as a clutch mechanism, said engaging element is formed as a clutch pawl, and said engaging element is formed as clutch teeth.

9. A speed control apparatus for a bicycle for selecting a speed position from a plurality of speed positions based on a wire winding amount, said apparatus being arranged for use with a takeup wire, said apparatus comprising:

a fixed element;

a displaceable control member;

a takeup portion for winding the takeup wire, said takeup portion being pivotally supported by said fixed element, wherein said takeup portion rotates with said control member in a wire winding direction to select one of said plurality of speed positions;

a position setting mechanism disposed between said control member and said fixed element, said position setting mechanism including and engaging element and an engageable element, and wherein said engageable element includes change speed engagement portions corresponding to said plurality of speed positions, and overshift engagement portions disposed at wire winding sides of the respective speed positions, and wherein said engagement element moves between an engaging position to engage said engageable element and a retracted position away from said engageable element, and said takeup portion is retained in a selected speed position by said engaging element engaging said engageable element; and sound producing means for amplifying a shock resulting from movement of said engaging element to said engaging position to produce a sound wherein said sound producing means includes a resonant body for producing a sound by said shock, and a hammer provided on said engaging element for directly striking said resonant body.

* * * * *